United States Patent
Nakagami

(10) Patent No.: US 7,284,939 B2
(45) Date of Patent: Oct. 23, 2007

(54) FASTENER WITH TIGHTENING STRUCTURE

(76) Inventor: Teruo Nakagami, Hiyoshi-cho432-8 Tatebe, Youkaichi-city (JP) 527-0006

( * ) Notice: Subject to any disclaimer, the term of this patent is extended or adjusted under 35 U.S.C. 154(b) by 0 days.

(21) Appl. No.: 11/355,498

(22) Filed: Feb. 16, 2006

(65) Prior Publication Data

US 2006/0291976 A1    Dec. 28, 2006

Related U.S. Application Data

(63) Continuation of application No. 10/250,658, filed as application No. PCT/JP01/10860 on Dec. 11, 2001, now abandoned.

(30) Foreign Application Priority Data

Jan. 12, 2001  (JP) ................................ 2001-4459

(51) Int. Cl.
 *F16B 39/12* (2006.01)
(52) U.S. Cl. ........................ 411/238; 411/265; 411/935; 411/368
(58) Field of Classification Search ................ 411/265, 411/253, 276, 368, 277, 278, 237, 238, 935, 411/935.1, 249, 247
See application file for complete search history.

(56) References Cited

U.S. PATENT DOCUMENTS

| | | | | |
|---|---|---|---|---|
| 2,244,400 A * | 6/1941 | Miller | ......................... | 411/238 |
| 2,261,195 A * | 11/1941 | von Herz et al. | ............. | 411/20 |
| 2,378,118 A * | 6/1945 | Widrich | ......................... | 411/20 |
| 2,387,742 A * | 10/1945 | Burrows | ......................... | 411/20 |
| 2,412,409 A * | 12/1946 | Martin | ......................... | 411/238 |
| 2,494,882 A * | 1/1950 | Kost | ............................ | 411/277 |
| 2,529,854 A * | 11/1950 | Tarwater | ...................... | 411/272 |
| 4,971,489 A * | 11/1990 | Womack | ....................... | 409/81 |
| 4,971,498 A * | 11/1990 | Goforthe | ..................... | 411/134 |
| 5,158,409 A * | 10/1992 | Ishida | .......................... | 411/107 |
| 6,112,371 A * | 9/2000 | Tremblay | ..................... | 16/362 |

* cited by examiner

*Primary Examiner*—Katherine Mitchell
(74) *Attorney, Agent, or Firm*—Howson & Howson LLP

(57) ABSTRACT

A tightening structure for locking, comprises a nut, a bolt, and a washer with a hole through which an axis of the bolt passes. To enable the structure to lock more firmly, a recessed part symmetrical with respect to an axis, and having a generally trapezoidal shape in cross section, is formed in the nut, and a projection, symmetrical with respect to an axis, and having a generally trapezoidal cross section is formed on the washer. The hole in the washer is eccentric to the projection of the washer.

12 Claims, 5 Drawing Sheets

FASTENER WITH TIGHTENING STRUCTURE

CROSS-REFERENCE TO RELATED APPLICATIONS

This is a continuation of application Ser. No. 10/250,658, filed Jul. 3, 2003 now abandoned, the disclosure of which is incorporated by reference. This application also claims the benefit, under 35 U.S.C. §271 of International Patent application PCT/JP01/10860, filed Dec. 11, 2001, and priority under 35 U.S.C. §119 on the basis of Japanese Patent Application 2001-4459, filed Jan. 12, 2001.

FIELD OF THE INVENTION

This invention is concerned with fasteners, and particularly to a tightening structure incorporating a nut and washer, for use in construction, for example.

BACKGROUND OF THE INVENTION

Major problems have been encountered in the past in maintaining locking engagement of the bolt and nut of a fastener assembly after the bolt and nut are tightened. In order to solve these problems, a washer is generally used between the bolt and the nut. For example, pages 45 to 46 of "Story of Screw" (author: Akira Yamamoto, Published by Zaidanhojin Nihonkikakukyokai, on Oct. 30, 1990) disclose a technique using a plane washer or spring washer. Laid-open Japanese patent publication Tokukaihei1-182614 discloses a special form of washer adapted to a spherical surface.

In the above-identified tightening structures, the resulting locking effect after tightening the bolt and the nut, is insufficient, and unlocking between the bolt and nut occurs inevitably. Therefore, this invention has been created in order to solve this problem and provide a tightening structure which can perform the function of locking more firmly, as well as strengthen the resulting joint after tightening of the bolt and nut.

SUMMARY OF THE INVENTION

In order to achieve the above object, a nut, a bolt, and a washer are used in the following ways. The washer contains a hole through which an axis of the bolt passes. A frusto-conical recessed part, symmetrical with respect to the axis and having a generally trapezoidal shape in cross section is formed in the nut on the side facing the washer, and a tapered projected part, symmetrical with respect to the axis and having a generally trapezoidal shape in cross section is formed on the washer. The hole in the washer is eccentric to the projected part of the washer. Herein, "the recessed part of the nut is fitted to the projected part of the washer" means that the center axis of the recessed part and the center axis of the projected part are common and that the recessed part and the projected part are in fitting relationship with each other.

The hole in the washer is formed in the portion of the projected part of the washer that fits into the recess in the nut, and the center of the hole is positioned eccentric with respect to the center of the projected part of the washer.

In addition, it is preferable that, where the recessed and projected parts comprise an upper surface part and a sloping part, the sloping part of the recessed part is straight, and the sloping part of the projected part is curved.

In addition, it is preferable that, where the recessed part of the nut is fitted to the projected part of the washer, and the recessed and projected parts both comprises an upper surface part and a sloping part, the angle of the sloping part of the recessed part is either a little larger or a little smaller than the angle of the sloping part of the projected part. However, the angle of the sloping part of the recessed part can be the same as the angle of the sloping part of the projected part. It is preferable that the outer surface of the projected part have a convex curvature in axial planes that intersect the outer surface.

In addition, a supporting part, or skirt, is preferably provided underneath the projected part of the washer, for engagement with an object to be secured between the washer and the head of the bolt.

It is also preferable that the supporting part be configured so that it extends along a face of the tightened object.

In addition, it is preferable that the ratio of the height of the female threaded part of the nut, to the height of the recessed part in the nut be approximately 2 to 1.

In addition, it is preferable that the angle of the sloping part in the nut be approximately 10 degrees with respect to the center axis.

In addition, where the recess in the nut is frusto-conical, and defined by first and second ends, both of which are circular, the first end of the recess having a larger diameter than the second end, and where the tapered projection has an outer surface at least part of which is also frusto-conical, and the frusto-conical part of the tapered projection is defined by a third circular end and a fourth circular end, the third circular end having a larger diameter than the fourth circular end, it is preferable that the diameter of the second end be equal to or greater than the diameter of the fourth end, and that the diameter of the third end be equal to or greater than the diameter of the first end.

In addition, it is preferable that the diameter of the hole of the washer be larger than the outer diameter of the female threaded part of the nut by the thread height of the female threaded part.

In addition, it is preferable that the axial dimension of the nut be greater than the axial dimension of the washer.

In addition, it is preferable that the thickness of the material of the washer be smaller than the pitch of the threads of the bolt.

DETAILED DESCRIPTION OF THE PREFERRED EMBODIMENTS

Embodiments of the invention will be described based on examples with reference to the drawings.

Figure 1A:
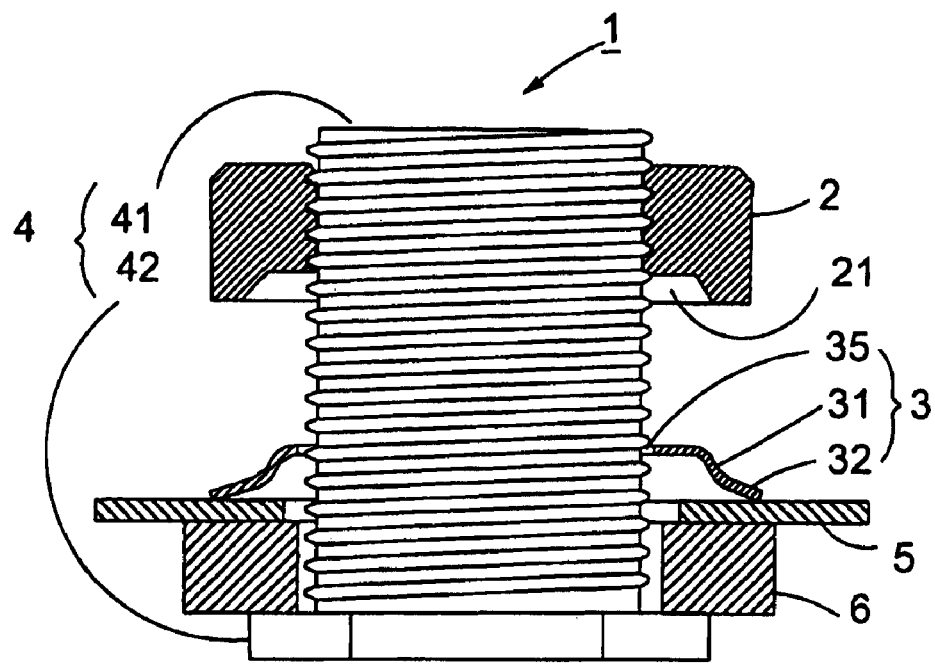
FIGS. 1(a) and 1(b) are cross-sectional views of the main part of the tightening structure according to a first example of the invention, FIG. 1(a) illustrating the structure before completion of tightening and FIG. 1(b) showing the structure after completion of tightening.
Figure 1B:
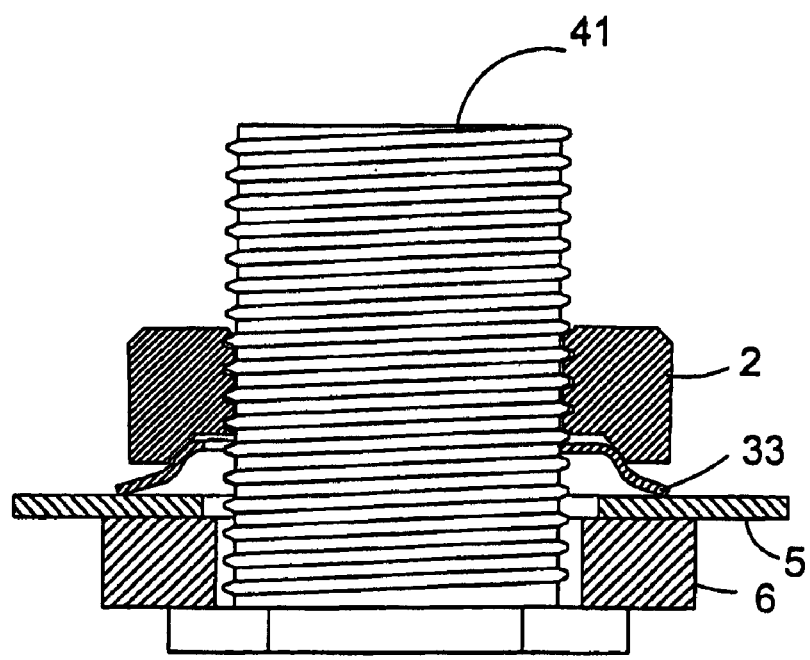
Figure 2A:
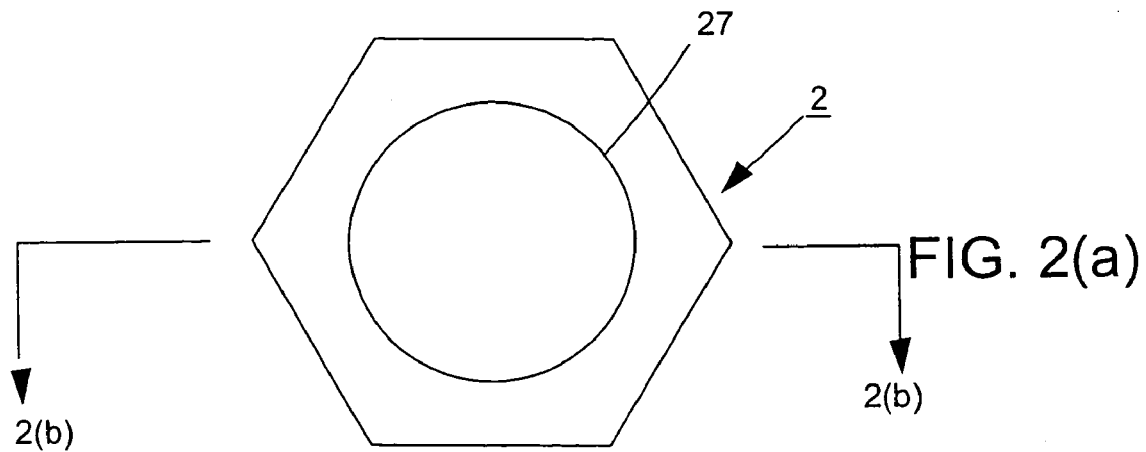
FIG. 2(a) is a schematic end view of the nut for the tightening structure according to the first example of the invention.
Figure 2B:
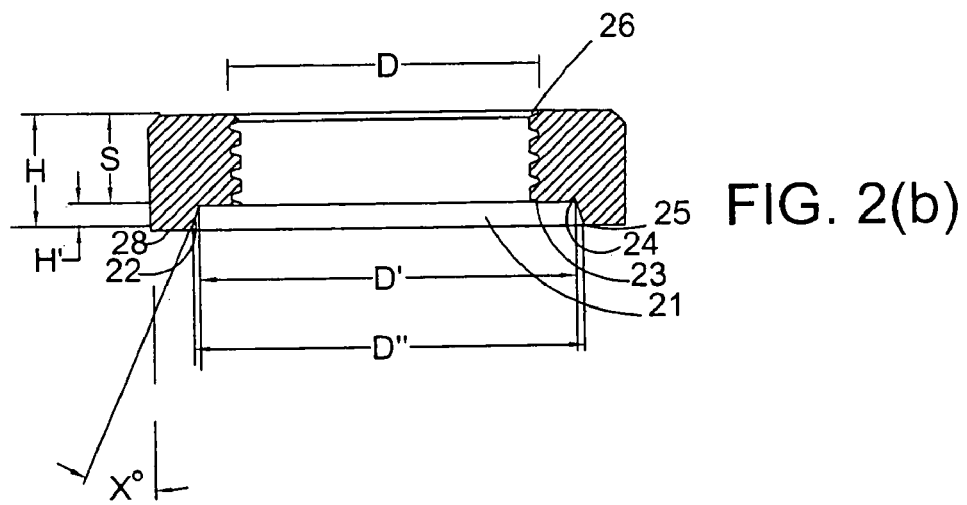
FIG. 2(b) is cross section taken on plane 2(b)–2(b) in FIG. 2 (a).

As shown in FIGS. 1(a) and 1(b), the tightening structure 1 according to the first example of the invention mainly consists of bolt 4, nut 2, and washer 3, elements 5 and 6 being examples of tightened objects. Bolt 4 consists of a threaded shank 41 and a head 42. A recessed part 21, symmetrical with respect to the axis of the shank of the bolt, and being frusto-conical, with a generally trapezoidal shape in cross section, is formed in the nut 2 on the side facing washer 3. A projected part 31, symmetrical with respect to the axis of the shank of the bolt, and also being generally frusto-conical, with a generally trapezoidal shape in cross section, is formed as part of the washer 3 on the side facing nut 2. As shown in cross section in FIG. 2(b), a female threaded part 26 is formed in the upper part of the inner side of nut 2. The female threads are adapted to be threaded onto the male threaded part formed on the shank of the bolt. The recessed part 21 of the nut is provided on the side of the nut facing the washer. Herein, "symmetrical with respect to the axis" means "symmetrical with respect to the central axis of the nut 2."

Figure 2C:
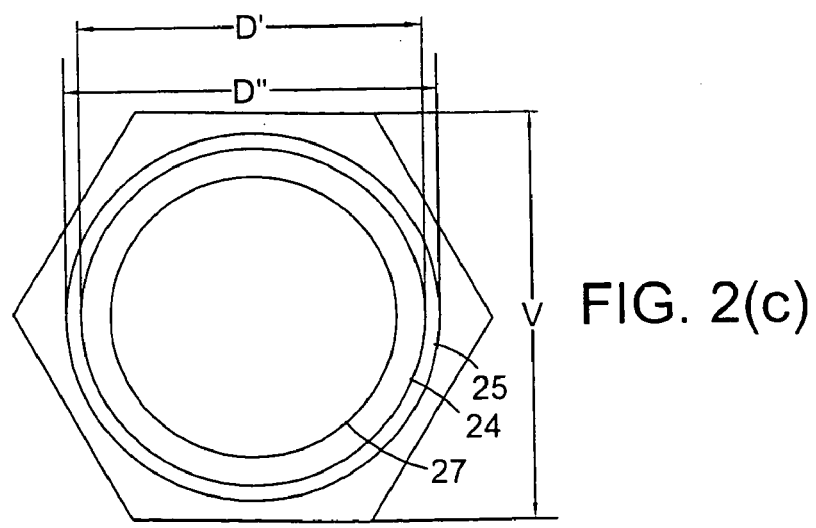
FIG. 2(c) is a schematic end view of the opposite end of the nut.

The recessed part 21 consists mainly of a frusto-conical sloping wall 22, defined between a larger circle 25, positioned at the intersection between the sloping part 22 and a lower surface 28, and a smaller circle 24 positioned at the intersection between an upper surface 23 and the sloping part 22, the smaller and larger circles being coaxial, as seen in FIG. 2(c). In this way, the recessed part 21 is symmetrical with respect to the axis, and has a generally trapezoidal shape in cross section. Circle 27 represents the inner diameter of the female threaded part 26 and is also coaxial with circles 24 and 25, as shown in FIG. 2(c).

Next, the detailed relation of the dimensions of nut 2 is explained. As shown in FIG. 2(c), V is the distance between the two opposite sides of the regular hexagon that defines the external shape of the nut. (This distance, hereinafter, is referred to as the "two sides width.") D, D', and D" respectively represent the outer diameter of the female threaded part 26, the diameter of the smaller circle 24, and the diameter of the larger circle 25. The relation of the dimensions V, D, D', and D" is expressed as:

$$D<D'<D''<V$$

That is, the outer diameter D of the female threaded part 26, the diameter D' of the smaller circle 24, the diameter D" of the larger circle 25, and two sides width V, in this sequence, become progressively longer, although the diameter D" of the larger circle 25 can be equal to the two sides width V.

H, S, and H' respectively represent the axial length of the nut, the axial length of the female threaded part 26, and the axial length of the recessed part 21. The relation of these three measures is expressed by $$H=S+H'$$

The length S of the female threaded part 26 has to be sufficient to achieve the necessary torque for tightening, and is therefore greater than the axial length H of the recessed part. Moreover, the approximate ratio H:S between these two heights is preferably 2:1.

"x" is the angle of the sloping part 22 with respect to the central axis of the nut. An angle of approximately 10 degrees with respect to the center axis is preferable.

Figure 3A:
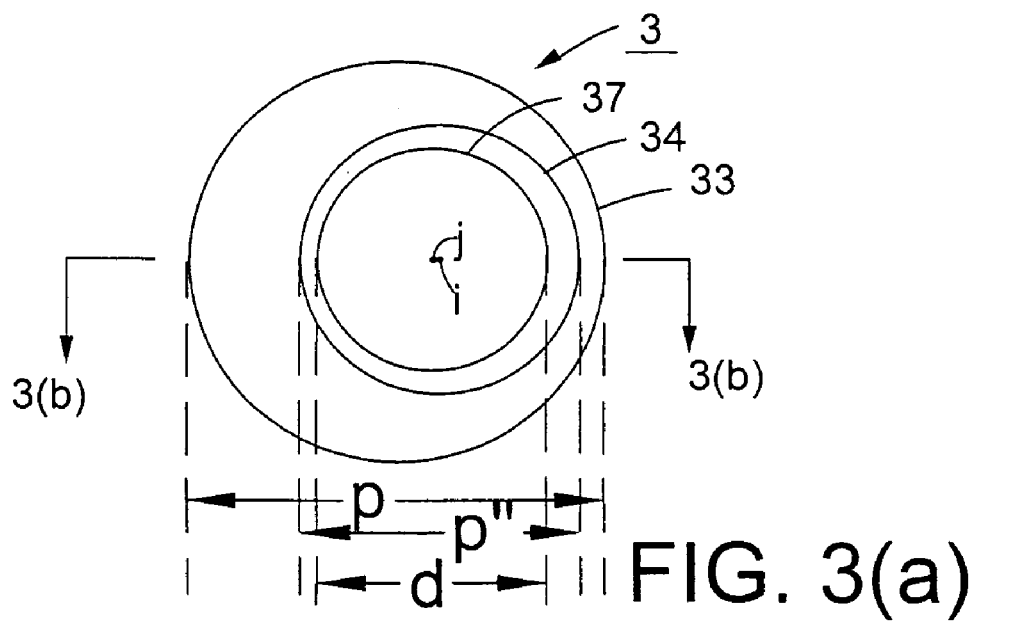
FIG. 3(a) is a schematic end view of a washer according to the first example of the invention.
Figure 3B:
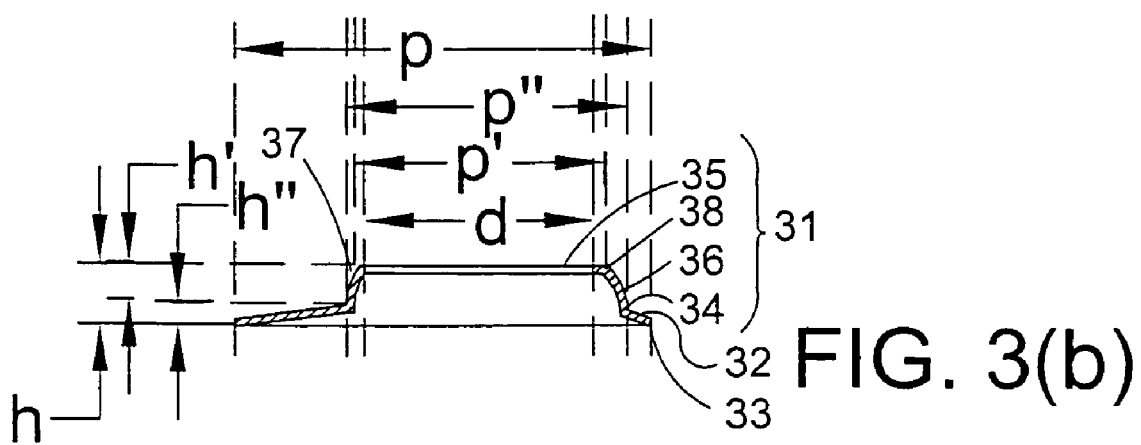
FIG. 3(b) is a cross section taken on plane 3(b)–3(b) in FIG. 3(a).

As shown in FIG. 3(b), washer 3 is characterized by a projected part 31 having a curved lower part 34, a curved part 36, and a hole 35. The projection has a generally frusto-conical shape. As shown in FIG. 3(a), the lower part 34 is symmetrical about the center "i" of the projection 31, which is common with central axis of the nut 2 in FIGS. 2(a), 2(b) and 2(c). The washer includes a supporting skirt 32 beneath the projection 31, and the lower edge 33 of the skirt 32 can contact a tightened object.

The edge 37 of the hole 35, which is positioned at the upper side of the projection 31, is in the form of a circle. As shown in FIG. 3(a), center of the hole 35 lies at the point "j." The center "j" of the hole 35 is therefore different from the center "i" of the projection 31, and the hole 35 is therefore eccentric with respect to the projection 31.

As shown in cross section in of FIG. 3(b), h, h', and h" respectively represent the height of the washer 3, the height of the projection 31, and the height of the skirt 32. The relation among these three values such as h, h', and h" is expressed by $$h=h'+h''$$

H>h, that is, the axial length H of the nut 2 is greater than the height h of the washer 3.

In the cross-sectional view in FIG. 3(b) d, p, p', and p" respectively represent the diameter of the hole 35, the diameter of the lower circle 33 of the skirt 32, the diameter of the circle consisting of the highest points of the curved part 36, and the diameter of the circle 34 consisting of the lowest points of the curved part 36. The relation between these four values d, p, p', and p" and the outer diameter D of the female threaded part 26 of the nut 2 in FIG. 2 is expressed by $$p>p''>p'>d>D$$

That is, the diameter p of the circle consisting of the lower circle 33, the diameter p" of the circle 34, the consisting of the curved lower points 34, the diameter p' of the circle consisting of the highest points of the curved part 36, and the outer diameter D of the female threaded part 26 of the nut 2, in this sequence, become progressively shorter. In this embodiment, d=D+a, a being the height of the threads of the threaded part.

In the first example of the invention, the relation between the diameter p' of the circle consisting of the highest points of the curved part 36, the diameter p" of the circle 34, the diameter D' of the smaller circle 24 of the recessed part 21 of the nut 2, and the diameter D" of the larger circle 25, is expressed by $$p'<D'<D''<p''$$

That is, the diameter p' of the circle consisting of the most highest points of the curved part 36 is equal to or smaller than the diameter D' of the upper circle 24 of the recessed part 21 of the nut 2, and the diameter p" of the circle 34 is equal to or larger than the diameter D" of the larger circle 25 of the recessed part 21 of the nut 2. As a result, in this first embodiment, when the recessed part 21 of the nut 2 and the projection 31 of the washer 3 are fitted together, the larger circle 25 of the recessed part 21 of the nut 2 exerts pressure around the curved part 36 of the projected part 31 of the washer 3.

As shown in FIG. 1(*a*), the tightened objects 6 and 5, and the washer 3 according to this invention, and in this order, are put on the head 41 of the bolt 4, and the nut 2 is rotated on the threaded shank of the bolt. First, the larger circle 25 of the recessed part 21 of the nut 2 contacts the curved part 36 of the projection 31 of the washer 3.

The center position "i" of the projected part 31 is common with the central axis of the nut 2. After the larger circle 25 of the recessed part 21 of the nut 2 contacts the curved part 36 of the projection 31 of the washer 3, as shown in FIG. 1(*b*), the curved part 36 of the projection 31 of the washer 3, and the recessed part 21 of the nut 2 fit together.

At this time, because the center position "j" of the hole 35 is spaced from the center position "i" of the projected part 31, as shown in FIG. 3(*a*), a part of the edge of the hole 35 enters the threads of the threaded part of shank 41 of bolt 4. Comparing FIGS. 1(*a*) and 1(*b*), the washer 3 moves to the left by a distance approximately corresponding to the height of the threads of the threaded part, with the result that the edge of hole 35 of the projection 31 of the washer 3, cuts into the threaded part of shank 41 of bolt 4.

As a result, after nut 2 is tightened using the washer 3, locking can be achieved because of the so-called wedge effect. That is, because tightening torque applied to nut 2 results in the application of a sideward force against the threaded part of shank 41 of bolt 4, a specific part of hole 35 of washer 3 cuts into the threaded part of shank 41 of bolt 4, and the relation between the washer 3 and the bolt 4 becomes fixed, resulting in a strong locking effect. The thickness of the material of the washer is preferably smaller than the pitch of the threaded part of the bolt so that the washer can more easily cut into the threaded part.

Figure 4:
FIG. 4 is a schematic perspective view illustrating the manner in which the washer twists when the bolt is tightened.

Moreover, because the threaded part of shank 41 of the bolt is helical, when hole 35 of washer 3 cuts into the threaded part of the shank 41 of this bolt 4, a twist arises at the location at which the threaded part contacts the edge of hole 35, as shown in FIG. 4. The cooperation between resulting twist of the washer and the helical threads increase the locking effect.

In the first embodiment, the washer 3 comprises a skirt 32. A spring action of this skirt 32 arises because of the tightening torque of nut 2. Because of this spring action, the inner edge of hole 35 of washer 3 cuts into the threaded part of shank 41 of bolt 4, with the result that the locking effect is stronger. Moreover, if the skirt is parallel to the surface of the tightened object, the washer is better able to move laterally as tightening takes place.

Because of the above-mentioned wedge effect, the threaded part and hole 35 of washer 3 are strongly fitted together, and the force is concentrated, with the result that, even if excessive tightening torque is applied, breakage because of excessive tightening can be prevented, and proper tightening is possible.

Figure 5A:
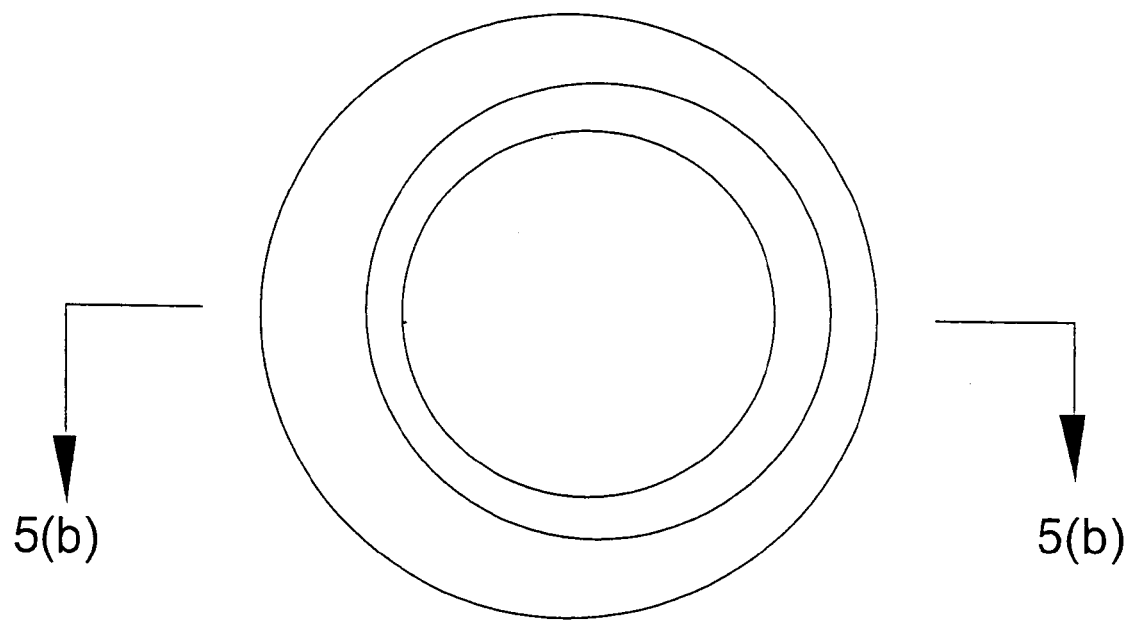
FIG. 5(a) is a schematic end view of a washer according to the second example of the invention.
Figure 5B:
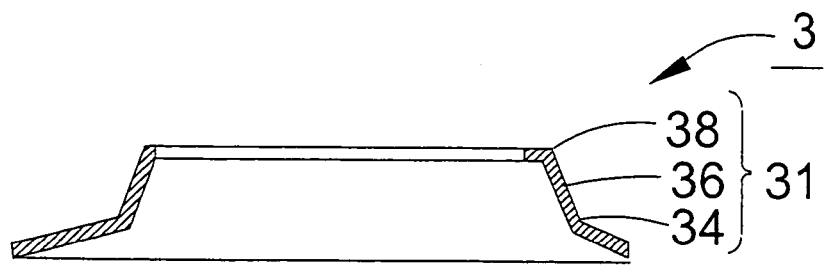
FIG. 5(b) is a cross section taken on plane 5(b)–5(b) in FIG. 5(a).

In the embodiment of the washer shown in FIGS. 5(*a*) and 5(*b*), the curved part 36 of the projection 31 is straight in cross section instead of curved. Therefore, as shown in FIG. 6 (*a*), the larger circle 25 of the recess in the nut comes into contact with the straight part washer 3.

The form of the projection can be varied, as can the materials of the nut or washer.

Figure 6A:
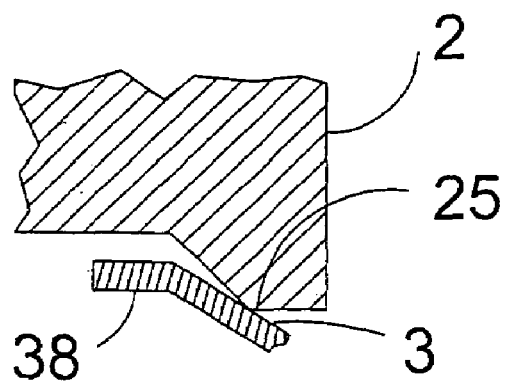
FIGS. 6(a), 6(b) and 6(c) are cross-sectional views of a tightening structure for locking according to another example of the invention, FIG. 6(a) showing a case in which the angle of the sloping part of the recessed part of a nut is a little larger than the angle of the sloping part of the projected part of the washer, FIG. 6(b) showing a case in which the angle of the sloping part of the recessed part of the nut is smaller than an angle of the sloping part of the projected part of the washer, and FIG. 6(c) showing a case in which the angle of the sloping part of the recessed part of a nut is the same as the angle of the sloping part of the projected part of the washer.
Figure 6B:
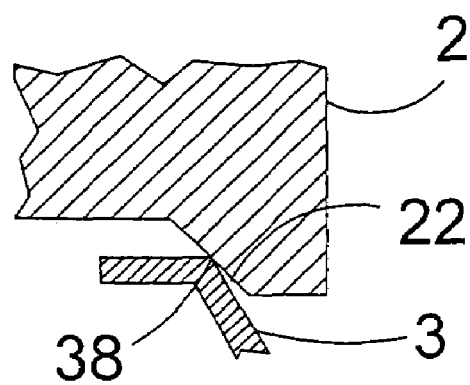
Figure 6C:
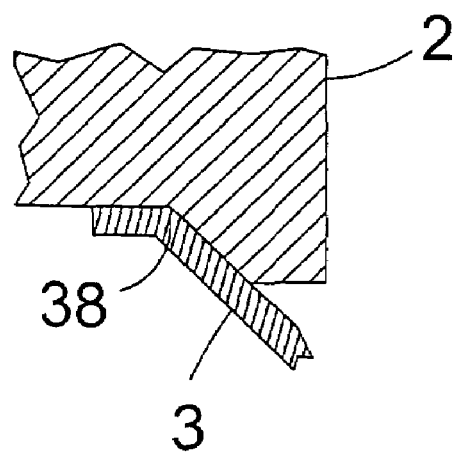

In another embodiment, as shown in FIG. 6 (*b*), the projection of washer 3 has a large slope, with the result that the upper part 38 of the projection comes into contact with the sloping part 22 of the recessed part 21 of the nut 2.

Moreover, in the embodiment shown in FIG. 6(*c*), the angle of the sloping part of the recessed part of a nut is the same as the angle of the sloping part of the projection of the washer, with the result that face-to-face contact takes place.

As described above, the tightening structure for locking and the nut and washer for the tightening structure can make firmer tightening possible.

What is claimed is:

1. A fastener comprising a bolt having a head and a threaded shank, a nut, having a threaded hole, threaded onto the threaded shank of the bolt, and a washer disposed on said threaded shank between the head of the bolt and the nut, wherein:

the threaded shank of the bolt and the threaded hole of the nut are substantially symmetrical about a common central axis extending lengthwise of the shank of the bolt, and the threads of the nut and shank have the same pitch;

said nut has a tapered recess facing said head of the bolt, the recess having a first end, and a second end farther than said first end from the head of the bolt, and a wall extending from said first end to said second end, said wall being tapered and symmetrical with respect to said common central axis, the taper of said wall being such that said first end of the recess is larger than said second end;

said washer comprises a sheet of material having a thickness smaller than the pitch of said threads, said washer having an object-engaging part in engagement with a face of an object surrounding the shank of the bolt, said object being prevented by the bolt head from disengagement from the bolt, and said sheet being formed with a tapered projection, said tapered projection extending into said tapered recess of the nut, and having a lower part and a tapered part, said tapered part having an external surface symmetrical about said central axis and said tapered part being in engagement with said tapered wall of the recess, and a passage in the washer through which the shank of the bolt extends, said passage including a hole formed in said projection at a location remote from said object-engaging part, said hole having an edge and being sufficiently eccentric with respect to a said external surface of the tapered part that rotation of the nut on said bolt in a direction to tighten the fastener on said object causes the wall of the recess in said nut to exert a lateral force on said washer, pressing said edge of the hole in the washer against the threads of the shank of the bolt, thereby exerting a locking action resisting loosening of the fastener.

2. A fastener according to claim 1, in which said object-engaging part of the washer is in the form of a skirt continuous with said tapered projection and extending outward therefrom in a direction away from said common central axis.

3. A fastener according to claim 1, in which said tapered wall of the recess in said nut is frusto-conical.

4. A fastener according to claim 1, in which said tapered wall of the recess in said nut is frusto-conical, and in which the tapered projection has an outer surface part of which is engageable with said tapered wall, said part of said outer surface of the tapered projection having a convex curvature in all axial planes which intersect said part of said outer surface of the tapered projection.

5. A fastener according to claim 1, in which said tapered projection has an outer surface that is tapered to such an extent that, when the nut is rotated on said bolt in a direction to tighten said fastener against said object, the engagement of the tapered wall of the recess in the nut with the external surface of the tapered projection takes place at said first end of the recess in the nut.

6. A fastener according to claim 1, in which said tapered projection has an outer surface that is tapered to such an extent that, when the nut is rotated on said bolt in a direction to tighten said fastener against said object, the engagement of the tapered wall of the recess in the nut with the external surface of the tapered projection takes place at a line of contact at an intermediate location between said first and second ends of said tapered recess.

7. A fastener according to claim 1, in which said tapered projection has an outer surface that is tapered to such an extent that, when the nut is rotated on said bolt in a direction to tighten said fastener against said object, the engagement of the tapered wall of the recess in the nut with the external surface of the tapered projection takes place over an area of contact extending through at least part of the distance between said first and second ends of said tapered recess.

8. A fastener according to claim 1, in which said tapered wall of the recess in said nut is frusto-conical, in which said tapered projection has an outer surface at least part of which is also frusto-conical, and in which the angles of taper of said tapered wall and part of said outer surface are substantially equal, whereby, when the nut is rotated on said bolt in a direction to tighten said fastener against said object, the engagement of the tapered wall of the recess in the nut with the external surface of the tapered projection takes place over an area of contact extending through at least part of the distance between said first and second ends of said tapered recess.

9. A fastener according to claim 1, in which the axial length of the threads of the nut is approximately twice the axial length of said recess.

10. A fastener according to claim 1, in which said tapered wall of the recess in said nut is frusto-conical, and disposed at angle of approximately 10 degrees relative to said axis.

11. A fastener according to claim 1, in which the recess in said nut is frusto-conical, and defined by said first and second ends, both of which are circular, said first end of the recess having a larger diameter than said second end; in which said tapered projection has an outer surface at least part of which is also frusto-conical, said frusto-conical part of the tapered projection being defined by a third circular end and a fourth circular end, said third circular end of said having a larger diameter than said fourth circular end; in which the diameter of said second end is equal to or greater than the diameter of said fourth end; and in which the diameter of said third end is equal to or greater than the diameter of said first end.

12. A fastener according to claim 1, in which said hole formed in said projection of the washer is circular and has a diameter which exceeds the outer diameter of the threads of the nut by an amount equal to the height of said threads.

* * * * *

UNITED STATES PATENT AND TRADEMARK OFFICE
CERTIFICATE OF CORRECTION

PATENT NO.       : 7,284,939 B2                                    Page 1 of 1
APPLICATION NO.  : 11/355498
DATED            : October 23, 2007
INVENTOR(S)      : T. Nakagami It is certified that error appears in the above-identified patent and that said Letters Patent is hereby corrected as shown below:

Column 3, line 64, "D<D'<D"<V" should read --D<D'<D"≤V--

Column 4, line 67, "p'<D'<D"<p'"" should read --p'≤D'<D"≤p"--

Signed and Sealed this

Eleventh Day of March, 2008

JON W. DUDAS
*Director of the United States Patent and Trademark Office*